US005573618A

United States Patent [19]
Rueckheim

[11] Patent Number: 5,573,618
[45] Date of Patent: Nov. 12, 1996

[54] METHOD FOR ASSEMBLING CUSTOM GLASS ASSEMBLIES

[75] Inventor: Eric W. Rueckheim, Muscoda, Wis.

[73] Assignee: Cardinal IG Company, Minnetonka, Minn.

[21] Appl. No.: 363,250

[22] Filed: Dec. 23, 1994

[51] Int. Cl.[6] .......................... B32B 17/06; B32B 31/16; C03C 27/06

[52] U.S. Cl. .......................... 156/104; 156/109; 156/286; 156/292; 156/382

[58] Field of Search .................................... 156/104, 107, 156/109, 286, 382, 292, 580; 52/172, 171.3

[56] References Cited

U.S. PATENT DOCUMENTS

| | | | |
|---|---|---|---|
| 4,248,656 | 2/1981 | Hofmann | 156/358 |
| 4,369,084 | 1/1983 | Lisec | 156/107 X |
| 4,780,164 | 10/1988 | Rueckheim et al. . | |
| 4,950,344 | 8/1990 | Glover et al. | 156/104 X |
| 5,017,252 | 5/1991 | Aldrich et al. | 106/104 X |
| 5,080,146 | 1/1992 | Arasteh | 141/4 |
| 5,088,188 | 2/1992 | Riou | 29/787 |
| 5,106,663 | 4/1992 | Box | 428/34 |
| 5,139,595 | 8/1992 | Taylor | 156/104 |
| 5,350,469 | 9/1994 | Lenhardt et al. | 156/107 X |

FOREIGN PATENT DOCUMENTS

| | | |
|---|---|---|
| 0056762 | 7/1982 | European Pat. Off. . |
| 0389706 | 10/1990 | European Pat. Off. . |

*Primary Examiner*—Michael W. Ball
*Assistant Examiner*—Sam Chuan Yao
*Attorney, Agent, or Firm*—Fredrikson & Byron, PA

[57] ABSTRACT

The present invention provides a method and apparatus for assembling a small number of custom sealed double glazing units in which spacers can have different widths and panes of different assemblies can be differently sized. In accordance with one method of the invention, a spacer having sealant on opposing surfaces thereof is adhered to a first glass pane and a resilient member is positioned alongside a portion of the spacer. A second glass pane is positioned over the spacer so that it is partially adhered to the spacer to define an interpane space around which the spacer is adhered, but with the resilient member preventing contact with the whole of the spacer, so maintaining a gap between a portion of the spacer and the second glass pane. The resulting assembly is moved into a gas exchange chamber, and air is removed from the chamber and accordingly also the interpane space. A gas having a coefficient of thermal conductivity lower than that of air is introduced into the chamber and accordingly also the interpane space, and the glass panes are pressed together while in the gas exchange chamber to compress the resilient member and adhere the second glass pane to all of the spacer to seal the interpane space.

6 Claims, 7 Drawing Sheets

METHOD FOR ASSEMBLING CUSTOM GLASS ASSEMBLIES

The present invention relates to a method and apparatus for assembling a small number of custom glass assemblies which may not have uniform sizes or shapes, and filling the glass assemblies with an insulating gas having a thermal conductivity that is less than that of air.

BACKGROUND

Conventional multi-pane insulating glass assemblies generally have two substantially parallel, spaced apart panes which are separated by a peripheral spacer. The spacers commonly are formed metal tubes constructed so as to have two flat, substantially parallel sides facing the interior surfaces of the panes. The interior surfaces of the panes are bonded to the sides of the spacer by a sealant material such as polyisobutelyne. To enhance the thermal resistance across such glass assemblies, the interpane space between the panes is filled with an insulating gas having a thermal conductivity that is less than that of air.

Glass assemblies are generally either uniform production line assemblies or custom made assemblies. Uniform production line glass assemblies are made in large quantities and all of the assemblies have the same size and shape. Because of the repetition involved in making uniform glass assemblies, it is generally cost effective to develop specific manufacturing assembly lines to manufacture large quantities of a single type glass assembly. Custom assemblies, on the other hand, are generally manufactured in very small quantities as low as a single assembly, and each assembly may have a unique size and shape.

The interpane space of a multi-pane glass assembly is filled with an insulating gas by drawing a vacuum to remove the air within the interpane space before both panes are sealed to the spacer, and then replacing the air with an insulating gas such as argon. After the interpane space is filled with an insulating gas, the panes are sealed to the spacer so that the gas does not escape into the atmosphere.

Several methods and apparatuses exist for assembling and replacing the air in a plurality of uniform glass assemblies. One method is disclosed in U.S. Pat. No. 5,017,252, entitled METHOD FOR FABRICATING INSULATING GLASS ASSEMBLIES, and another method and apparatus is disclosed in U.S. Pat. No. 4,780, 164, entitled METHOD FOR PRODUCING GAS-CONTAINING INSULATING GLASS ASSEMBLIES, the disclosures of which are herein incorporated by reference. Several uniform glass assemblies may be simultaneously filled with gas in a single gas exchange cycle because the uniformity of the assemblies allows them to be arranged adjacent to one another so that the spacers are aligned with one another. The panes of each assembly are compressed against the adhesive on the spacer under either the weight of the adjacent assemblies or by a single hydraulically actuated platen. By arranging the assemblies so that the spacers are aligned with one another, the compressive forces are borne by the spacers and the glass aligned with the spacers. Accordingly, the only portions of the panes of a uniform glass assembly that bear any loading are those that are supported by the spacers. Yet, when custom glass assemblies are arranged in the same manner, there will be an unsupported portion in the larger of two adjacent panes because the spacers cannot be aligned. As such, conventional methods and devices for filling a plurality of uniform gas assemblies are not useful for filling custom glass assemblies.

Another device for assembling and filling glass assemblies one at a time is disclosed in European Patent No. 0 056 762. The device disclosed in European Patent No. 0 056 762 includes a series of rollers inclined at an angle and an inclined surface which provides an air bearing to transport a single pane of glass and a spacer into a gas exchange chamber. The gas exchange chamber has a pivoting platen which carries the second pane. The first pane and spacer are moved into the chamber opposite the platen, and after an insulating gas has been exchanged for the air in the chamber, the second pane is pressed against the spacer to seal the interpane space between the panes. The device shown European Patent No. 0 056 762 does not adequately seal custom glass assemblies having spacers of different widths without requiring significant adjustments of the pivoting platen. Moreover, it is difficult to properly align the first and second panes of custom glass assemblies in the device shown European Patent No. 0 056 762 because at least one of the panes is fixed to the platen before it is pressed against the spacer. As such, the other pane must be positioned on the rollers and the air bearing without knowing the precise alignment with the pane carried by the spacer. Because of the difficulty in aligning the panes, it would appear that experimentation is required to use the device discussed in European Patent No. 0 056762 to properly align the panes of a custom glass assembly.

It would be advantageous to provide a method and apparatus for quickly assembling a small number of custom insulating glass assemblies and filling such glass assemblies with an insulating gas.

SUMMARY OF THE INVENTION

The present invention provides a method and apparatus for quickly assembling a small number of custom insulating glass assemblies in which the spacers are not necessarily the same width and the panes of different assemblies are not necessarily the same size or shape. The method includes providing an assembly line having a lay-up station, a gas exchange chamber and roller means for transporting a glass assembly from the lay-up station to the gas exchange chamber. The gas exchange chamber has a support surface to receive the glass assembly and at least one movable platen. The method continues by providing first and second glass panes which each have a bottom edge, a top portion, an interior surface and an exterior surface. A spacer which has a sealant disposed on opposing sides thereof, and a resilient member which has a width larger than the width of the spacer are also provided, The component parts of a glass assembly and the resilient member are then partially assembled by adhering the panes to the spacer while maintaining a gap between a portion of the spacer and one of the panes, and positioning the resilient member between the panes outwardly of the spacer to maintain the gap. The partially assembled glass assembly is then translated into the gas exchange chamber where a vacuum is drawn so as to remove substantially all of the air within an interpane space through the gap, A gas having a coefficient of thermal conductivity lower than that of air is then admitted into the gas chamber until the interpane space is filled with the gas. The platen is then moved within the gas exchange chamber so as to compress the resilient member and sealingly adhere the interior surface of the second pane to the spacer, thereby eliminating the gap and substantially sealing the interpane space. The method concludes by removing the resilient member from the glass assembly.

In a preferred embodiment of the invention, a press station is provided after the gas exchange chamber. The method of this embodiment includes further compressing the panes against the spacer to obtain the desired thickness of adhesive on both sides of the spacer.

The apparatus for assembling a small number of custom insulated multi-pane glazing units and filling the glass assemblies with an insulating gas includes a resilient member positionable between first and second panes of a glass assembly, a lay-up station and a gas exchange chamber. The lay-up station has a roller means for transporting the glass assembly from the lay-up station. The glass assembly is partially partly assembled on the lay-up station by adhering the panes to a spacer while maintaining a gap between a portion of the spacer and one of the panes, and positioning the resilient member between the panes outwardly of the spacer to maintain the gap. The gas exchange chamber is for replacing air within an interpane space between the panes of the glass assembly with an insulating gas having a coefficient of thermal conductivity that is less than that of air. The gas exchange chamber has a roller means and a support surface to receive the glass assembly, a vacuum for removing substantially all of the air within the chamber and the interpane space, a gas supply for filling the interpane space with the insulating gas and at least one platen positioned opposite the support surface. The platen is positionable opposite the glass assembly and is engageable with the second pane for compressing the resilient member so as to sealingly adhere the panes to the spacer, thereby eliminating the gap and sealing the interpane space.

In a preferred embodiment of the invention, a press station is provided after the gas exchange chamber. The press station includes a roller means and a support surface to receive the glass assembly from the gas exchange chamber, and at least one press plate positioned opposite the support surface. At least one actuator is attached to the plate for moving the plate towards the support surface. The plate is controlled in a manner to precisely determine the distance that the plate is driven.

BRIEF DESCRIPTION OF THE DRAWINGS

FIG. I is a perspective view of an apparatus in accordance with the invention.

DETAILED DESCRIPTION OF A PREFERRED EMBODIMENT

Figure 1:
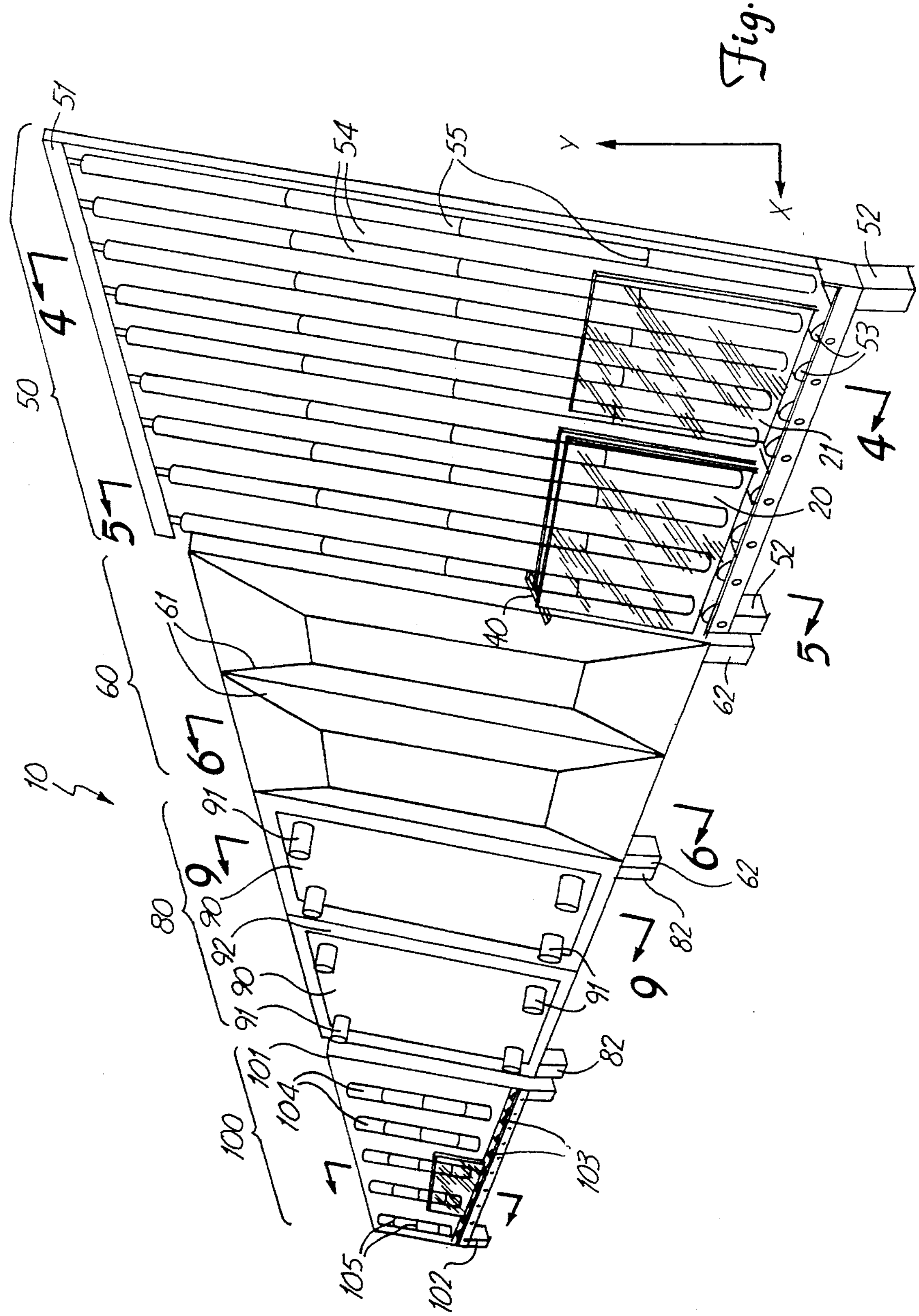

FIG. I depicts an apparatus 10 in accordance with the invention for assembling a small number of custom glass assemblies which may not have uniform sizes or shapes, and filling the glass assemblies with an insulating gas. The apparatus includes a lay-up station 50, a gas exchange chamber 60, a press station 80 and a lay-down station 100.

The lay-up station 50 includes a frame 51 which rests on a number of legs 52. A plurality of first rollers 53 are positioned at the bottom of the frame 51 and each roller is rotated about an axis that is inclined at an acute angle relative to the horizontal axis x. A plurality of second rollers 54 are positioned at an acute angle relative to the vertical axis y and rotated about an axis that is substantially normal to the axis of rotation of the first rollers 53. The second rollers 54 are generally elongated rods that extend from just above the first rollers 53 to the top of the frame 51, and each roller 54 may have a number of protective bands 55 positioned circumferentially about the exterior of the roller at intervals along its length. The protective bands 55 may be made from rubber or other shock absorbing materials that have a sufficiently high coefficient of friction to allow a pane 21 to rotate the rollers 54 as it is translated to the gas exchange chamber 60.

The gas exchange chamber 60 is positioned immediately down-line from the lay-up station 50, and the press station 80 is positioned immediately down-line from the gas exchange chamber 60. In FIG. 1, the gas exchange chamber 60 and press station 80 are viewed from the front which shows the platen wall 61 of the gas exchange chamber 60 and the press plates 90 and actuators 91 of the press station 80.

The lay-down station 100 is down-line from the press station 80. The laydown station is similar to the lay-up station 50, in that it has a plurality of first rollers 103 and second rollers 104 that are positioned the same as the roller 53 and 54 of the lay-up station. As with the lay-up station 50, the second rollers 104 of the lay-down station 100 may also have a number of protective bands 105 of shock absorbing material positioned circumferentially around the rollers 104 along their length. The lay-down station 100 also includes a pivoting frame 101 which may be rotated so that the second rollers 104 define a plane which is generally parallel to the plane defined by the horizontal axis x.

Figure 2:
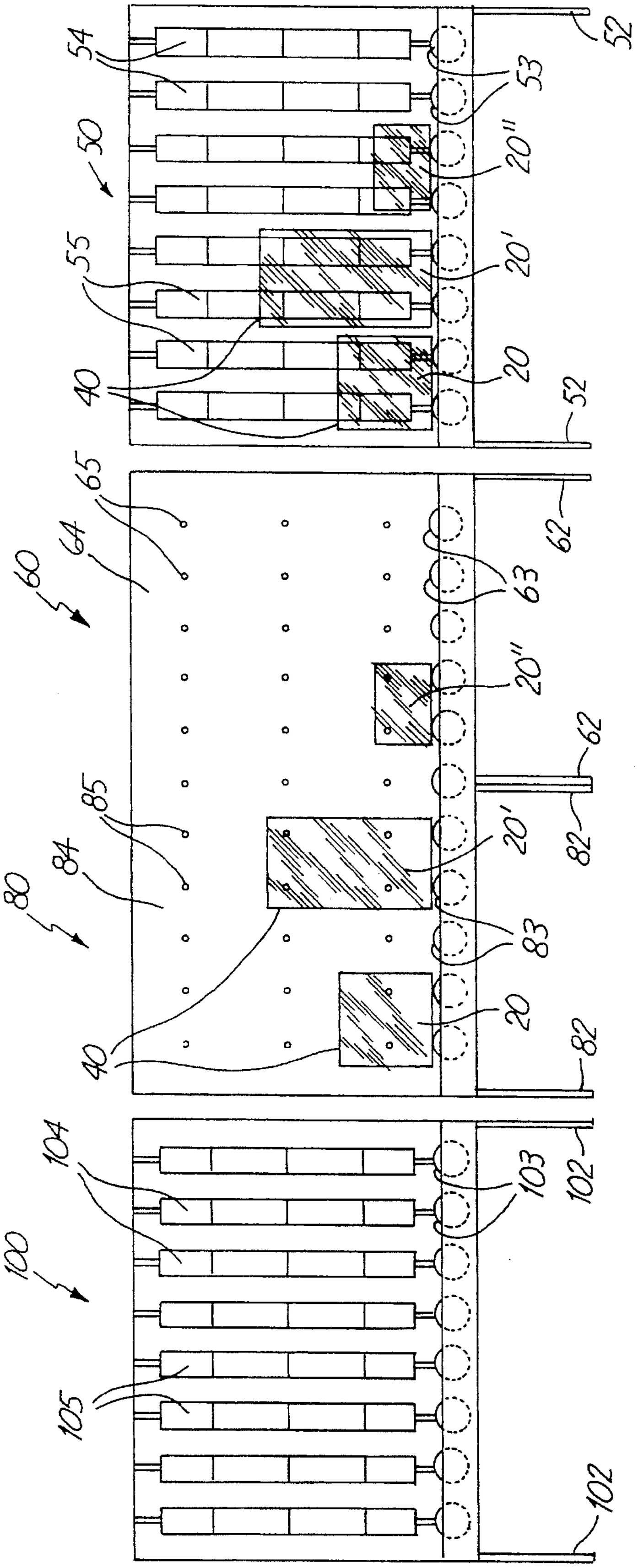
FIG. 2 is a front elevational view of the apparatus of FIG. 1.

FIG. 2 is a front elevation view of the apparatus 10 showing the fixed structure of the gas exchange chamber 60 and the press station 80 without the platen wall 61 or the press plates 90. Three glass assemblies 20, 20 'and 20 "of different sizes and shapes are shown initially resting on the first rollers 53 and the second roller 54 in a partly assembled state. The glass assemblies may be easily moved from the lay-up station 50 to the gas exchange chamber 60 by first rolling the assemblies along the rollers 53 and 54 until the assemblies engage the rollers 63 and support surface 64 of the gas exchanger 60. The rollers 63 are rotated about an axis that inclined at an angle to the horizontal axis x, which is preferably the same angle of inclination as that of the rollers 53. The support surface 64 is inclined at an angle relative to the vertical axis y and is positioned substantially normal to the axis about which the roller 63 rotate.

A number of orifices 65 are positioned through the support surface for directing pressurized air through the support surface 64 to provide an air bearing upon which the glass assemblies 20, 20' and 20" may be translated while they are in the gas exchange chamber 60. The orifices may be separately connected to individual air lines, or they may be positioned on a wall of a plenum chamber.

The fixed structure of the press station 80 is similar to that of the gas exchange chamber 60. The glass assemblies may be easily moved from the gas exchange chamber 60 to the press station 80 by moving the assemblies along the rollers 63 and support surface 64 of the gas exchanger 60 until they reach the rollers 83 and support surface 84 of the press station 80. The rollers 83 are also rotated about an axis that is inclined at an angle to the horizontal axis x, which is preferably the same angle of inclination as that of the rollers 53 and 63. The support surface 84 is inclined at an angle relative to the vertical axis y and is positioned substantially normal to the axis about which the roller 83 rotate.

A number of orifices 85 are positioned through the support surface 84 for directing pressurized air through the support surface 84 to provide an air bearing upon which the glass assemblies 20, 20' and 20" may be translated while they are in the press station 80. The orifices 85 may be separately connected to individual air lines, or they may be positioned on a wall of a plenum chamber.

Figure 3:
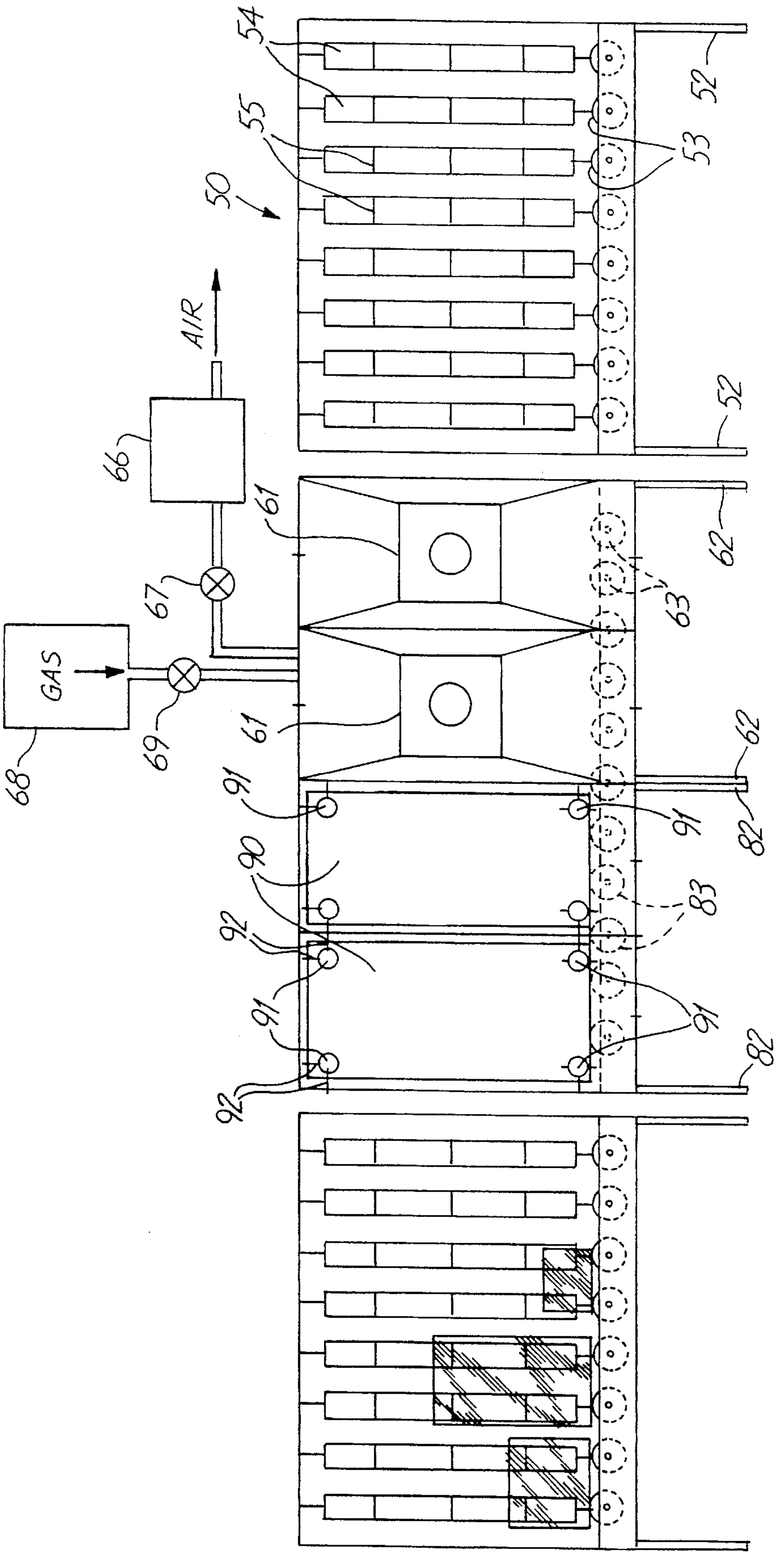
FIG. 3 is another front elevational view of the apparatus of FIG. 1.

FIG. 3 depicts another front elevational view of the apparatus 10 in which the platen wall 61 and the press plates 90 are positioned with respect to their fixed structures. The gas exchange chamber 60 further includes a pressurized gas supply 68 and a vacuum pump 66. When the gas exchange chamber 60 is closed and sealed, air is removed by activating the vacuum pump 66 and opening valve 67. After substantially all of the air is removed from within the gas exchange chamber 60, valve 67 is closed and valve 69 is opened so that a pressurized gas having an thermal conductivity that is less than that of air is forced into the gas exchange chamber. In a preferred embodiment, a vacuum of about 0.01–0.05 atmospheric pressure is drawn within the gas exchange chamber 60 and the insulating gas is fed into the chamber until the pressure within the chamber is between 0–2psi.

Figure 4:
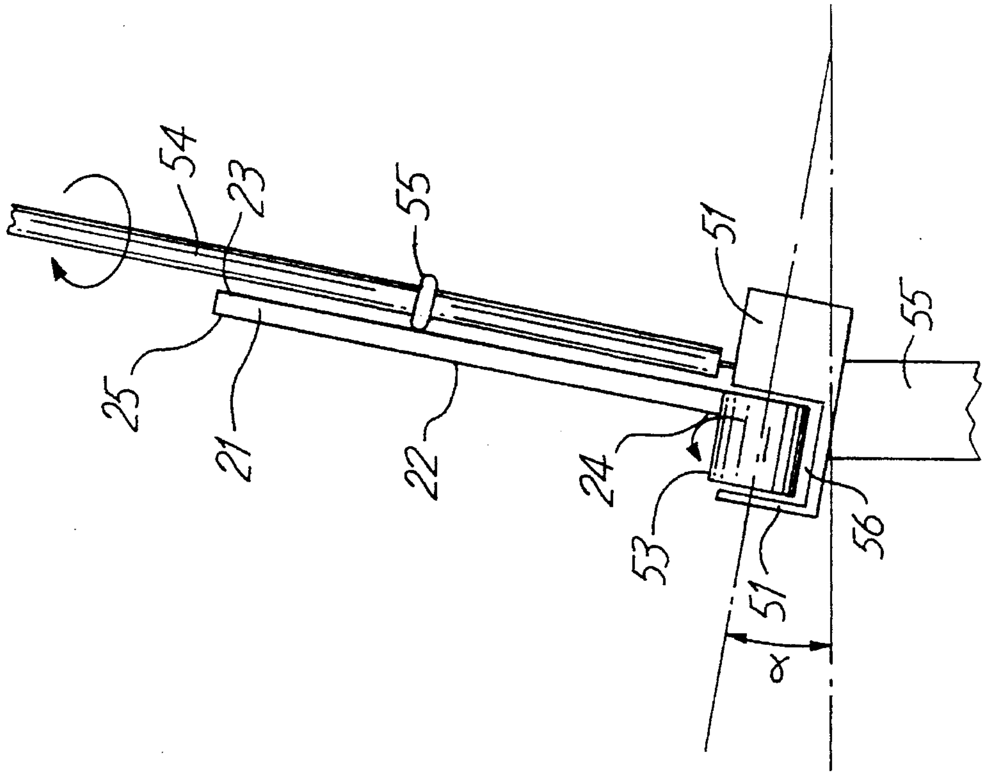
FIG. 4 is a partial cross-sectional side elevational view of a lay-up station of the apparatus of FIG. I taken along line 4—4.

The method and operation of a preferred embodiment of the invention are best shown in FIGS. 4–10A and 10B. FIG. 4 is a cross-sectional side elevation view of a first pane 21 of glass positioned on the rollers 53 and 54 of the lay-up station 50. The pane 21 has an interior surface 22, an exterior surface 23, a bottom edge 24 and a top portion 25. The rollers 53 supportively abut the bottom edge 24 and the protective bands 55 supportively abut the exterior surface 23. As best shown in FIG. 4, the axis about which the roller 53 rotate is positioned at an acute angle $\alpha$ with respect to the horizontal axis x and the rollers 54 rotate about an axis that is substantially normal to the axis of rotation of the rollers 53.

Figure 5:
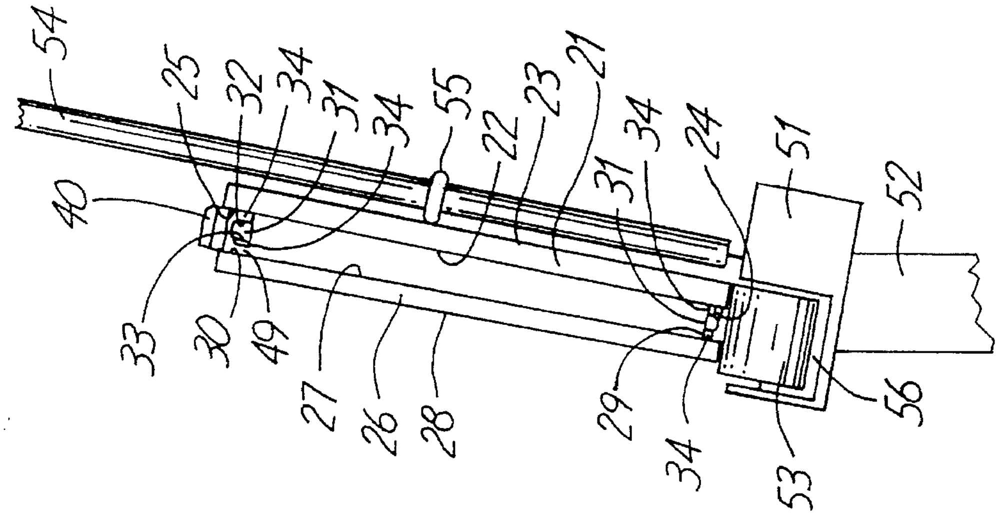
FIG. 5 is a partial cross-sectional side elevational view of a lay-up station of the apparatus of FIG. I taken along line 5—5.

FIG. 5 is a cross-sectional side elevation view of a partly assembled glass assembly 20 positioned on the rollers 53 and 54 of the lay-up station 50. A spacer 31 with an adhesive 34 spread in a thin layers on first and second sides 32, 33, respectively, is attached along the full length of its first side 32 to the interior surface 22 of the first pane. The adhesive 34 is preferably polyisobutelyne, but other adhesives may be used. A second pane 26, which has a interior surface 27, an exterior surface 28, bottom edge 29 and a top portion 30 is positioned in a partly assembled state on the rollers 53. The second pane 26 is positioned on the lay-up station 50 so as to contact the adhesive 34 on the second side 33 of the spacer 31 only on a portion of the interior surface 27 that is just above the bottom edge 29. Additional portions of the interior surface 27 of the second pane 26 are prevented from contacting the adhesive 34 on the second side 33 of the spacer 31 by positioning a resilient member 40 in a corner of the partly assembled glass assembly 20 between the top portion 30 of the interior surface 27 of the second pane 26 and the top portion 25 of the interior surface 22 of first pane 21. By positioning the resilient member 40 between the first and second panes, a gap 49 is created between the second side 33 of the spacer 31 and the interior surface 27 of the second pane 26 along three legs of the spacer.

The resilient member 40 may be a rectilinear cube of foam, a spring or a C-shaped plastic member that buckles under added pressure. The resilient member 40 has a sufficient load deflection factor to maintain the gap 49 between the panes until the interior surface 27 of the second pane 26 is pressed against the adhesive 34 on the second side 33 of the spacer 31. Yet, the load deflection factor of the resilient member 40 is low enough that the resilient member will not separate the interior surface 27 of the second pane 26 from the adhesive 34 on the second side 33 of the spacer under the load of the second pane 26 and the bonding friction of the adhesive 34.

The load deflection factor of the resilient member 40 necessary to operate the method and apparatus of the invention vary depending upon the angle at which the glass assemblies are inclined, the mass of the panes and the adhesiveness of the adhesive. Accordingly, different resilient members 40 may be necessary to effectively operate the invention in light of the number of different sizes and shapes of custom glass assemblies.

Figure 7:
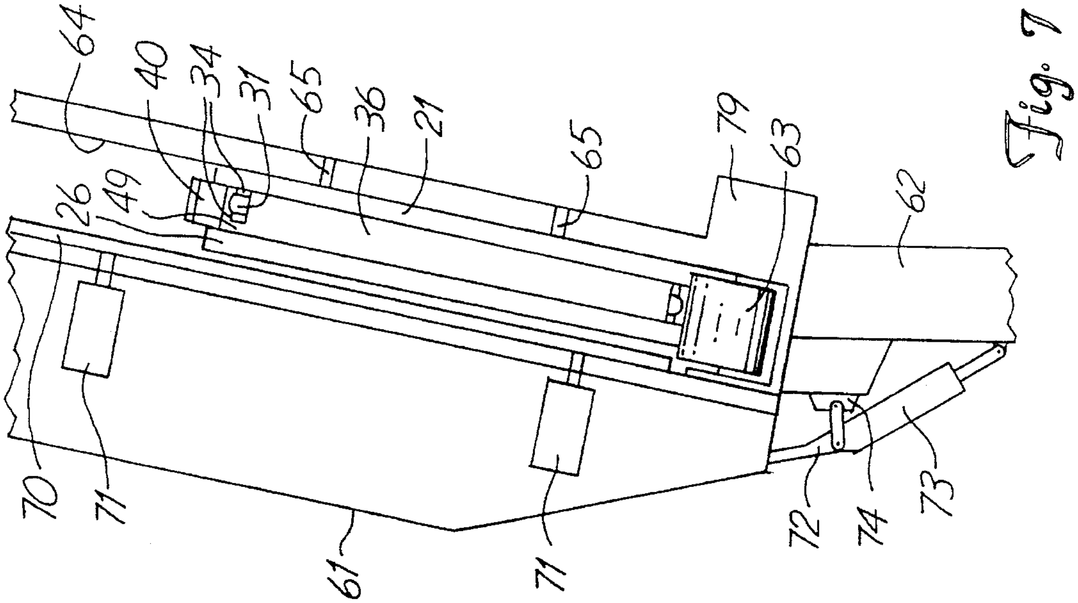
FIG. 7 is another partial cross-sectional side elevational view of the gas exchange chamber of FIG. 6.
Figure 6:
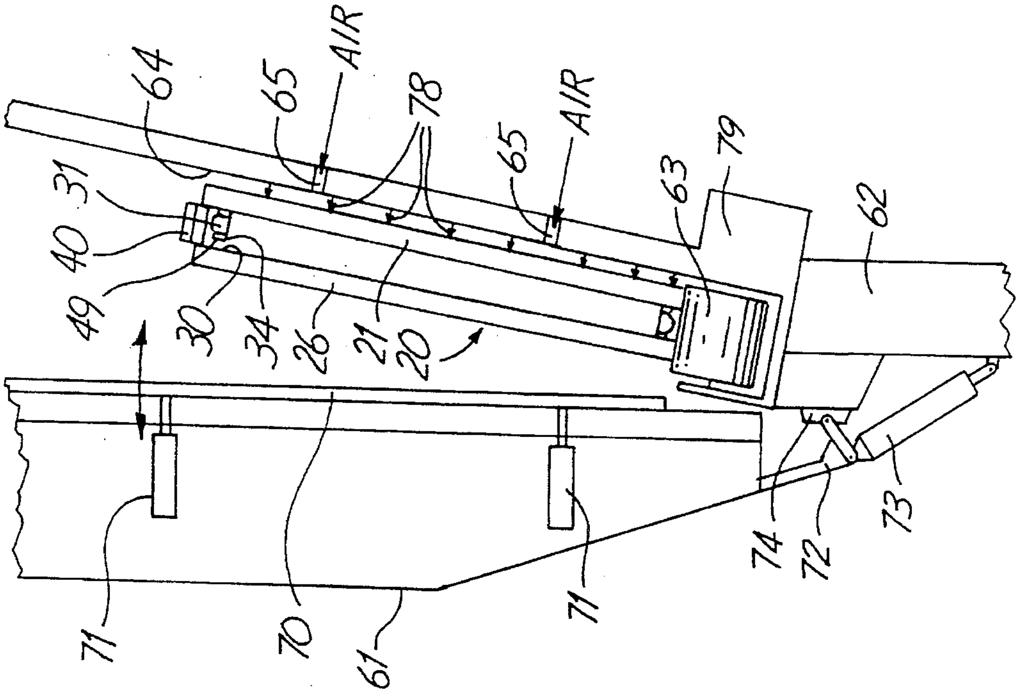
FIG. 6 is a partial cross-sectional side elevational view of a gas exchange chamber of the apparatus of FIG. I taken along line 6—6.

Referring to FIGS. 6 and 7, a partly assembled glass assembly 20 is shown positioned in the gas exchange chamber 60. The platen wall 61 is pivoted about a bracket 74 by an actuator 73 and link assembly 72 between an open position as shown in FIG. 6 and a closed position as shown in FIG. 7. When the platen wall 61 is in the open position, air may be forced through the orifices 65 in the support surface 64 to create and air bearing 78. A partly assembled glass assembly 20 may be translated on the air bearing 78 over the support surface 64 until it is positioned opposite a platen 70.

After the partly assembled glass assembly 20 is appropriately positioned opposite a platen 70 within the gas chamber 60, the platen wall 61 is closed to seal the gas exchange chamber as shown in FIG. 7. Air is then removed from within the sealed gas exchange chamber and an insulating gas is bled into the chamber as described above. As the vacuum is drawn in the gas exchange chamber 60, air is also removed from within the interpane space 36 of the glass assembly 20 through the gap 49. Similarly, as the insulating gas is bled back into the gas exchange chamber 60, the insulating gas passes through the gap 49 and fills the interpane space 36. The pressure of the insulating gas in the chamber, and thus the interpane space 36 as well, may be varied from 0–2 psi in order to ensure that the interpane space is adequately filled with the insulating gas and to obtain a desired distance between the panes. It will be appreciated that the distance between the panes under atmospheric conditions may be increased by pressurizing the gas in the interpane space to above atmospheric pressure before the gap 49 is closed. Accordingly, the distance between the panes of the glass assembly may be adjusted by pressurizing the interpane pace 36 with the insulating gas to a predetermined pressure.

Figure 8:
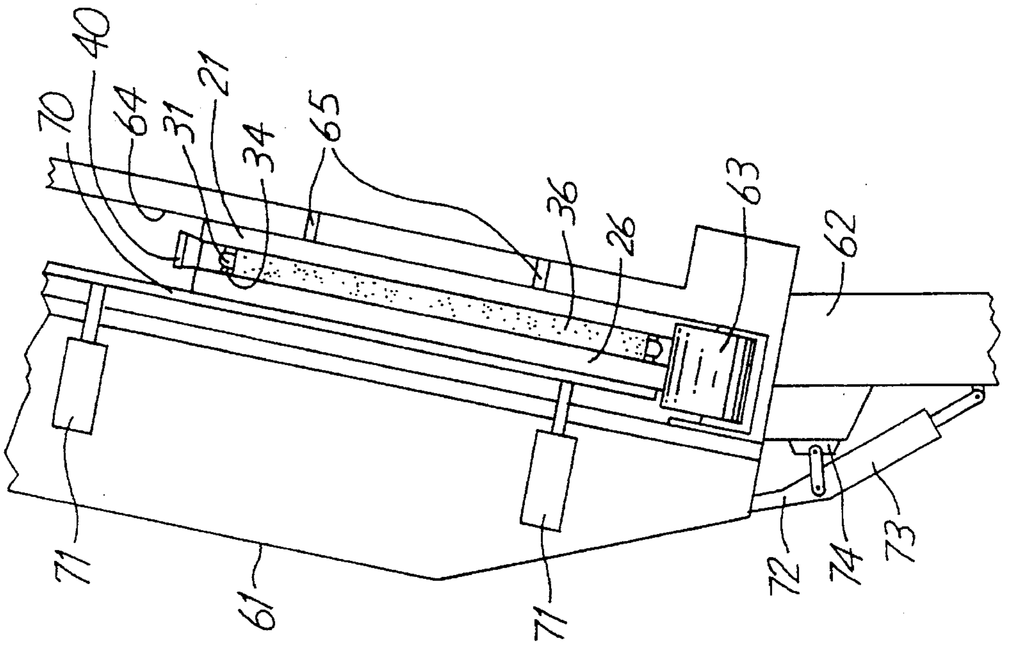
FIG. 8 is another partial cross-sectional side elevational view of the gas exchange chamber of FIG. 6.

Referring to FIG. 8, after the interpane space 26 has been filled with an insulating gas, it is sealed by driving the platen 70 against the exterior surface 28 of the second pane 26. As the platen 70 drives the second pane 26, the second pane compresses the resilient member 40 until the top portion 30 of the interior surface 27 contacts and compresses the adhesive 34 on the second side 33 of the spacer 31. In order to adequately seal and adhere the interior surface 27 to the adhesive 34, the second pane should be driven until the adhesive is approximately 0.015 to 0.020 inches thick. The interpane space 36 is sealed from the outer environment once the interior surface 27 of the second pane sufficiently compresses the adhesive 34, and the seal is maintained after the platen 70 is removed from the second pane 26 since the compressed resilient member 40 is not so resilient as to overcome the weight of the second pane 26 and the bonding friction of the adhesive 34.

The platen 70 may be driven by one or more hydraulic actuators 71. The gas exchange chamber 60 generally has a number of individually operable platens 70, each of which engages only a single glass assembly 20. By having a number of individually controlled platens 70, several different custom glass assemblies 20, 20' and 20" may be partly assembled on the lay-up station 50 and then simultaneously filled with an insulating gas in a single cycle.

Figure 9:
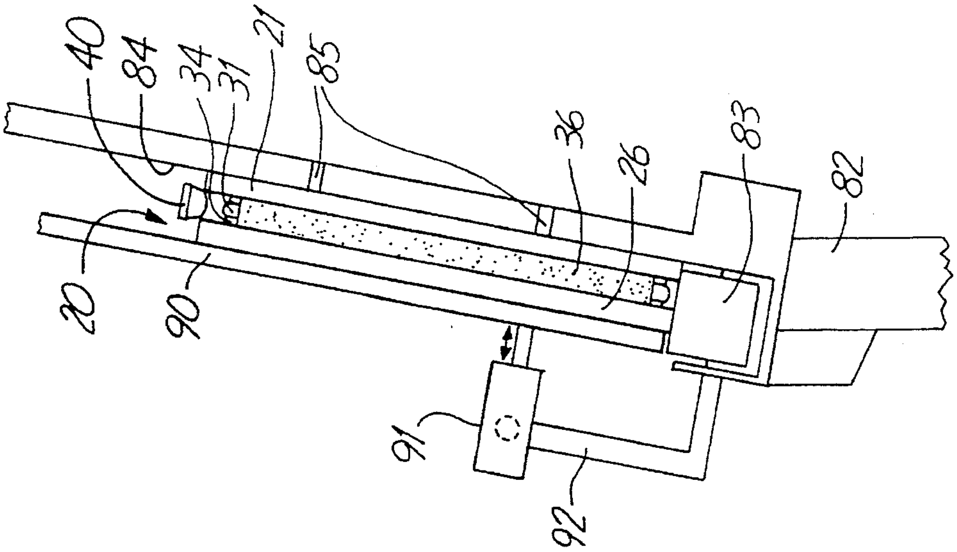
FIG. 9 is a partial cross-sectional elevational view of a press station of the apparatus of FIG. of FIG. 1 taken along line 9—9.

Referring to FIG. 9, a gas filled glass assembly 20 is shown positioned in the press station 80. One of the linear actuators 91 is shown attached to the press plate 90 in FIG. 9, but in a preferred embodiment a linear actuator is positioned in each corner of the press plate 90 as shown in FIGS. I and 3. Each linear actuator 91 is attached to the frame of the press station by at least one bracket 92. The linear actuators may be hydraulic cylinders, pneumatic cylinders, electric servo-motors or any other type of actuator that can linearly drive a rod a precise distance. The linear actuators 91 move the press plates 90 in a direction which is parallel to the longitudinal axis of the actuators and substantially normal to the support surface 84.

In operation, a sealed glass assembly 20 is positioned opposite a press plate 90 in the press station 80 on an air bearing in the same manner that a partially assembled glass assembly is positioned opposite a platen 70 in the gas exchange chamber 60. Once a glass assembly is properly positioned, the linear actuators 91 drive the press plate 90 against the exterior surface of the second pane 26 to further compress the adhesive 34 until it is about 0.010 inches thick. The purpose of the press assembly 80 is to more accurately compress the panes and adhesive together to form a thin, uniform layer of adhesive 34 around the full length of the spacer 31. Accordingly, it is important that the actuators 91 be able to precisely control the distance that the press plate 90 is driven.

Figure 10A:
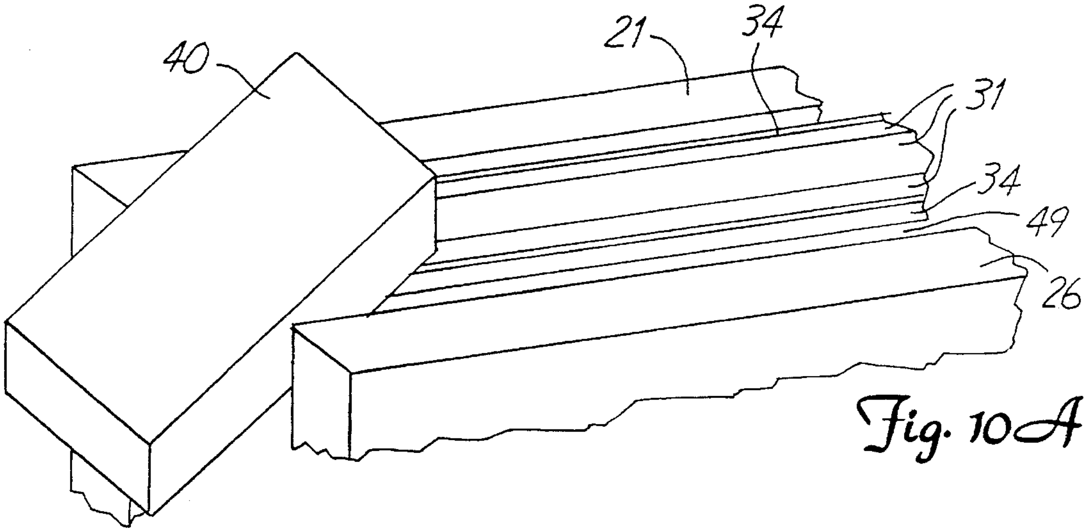
FIG. 10A is a partial perspective view of a resilient member in accordance with the invention in a fully expanded condition.
Figure 10B:
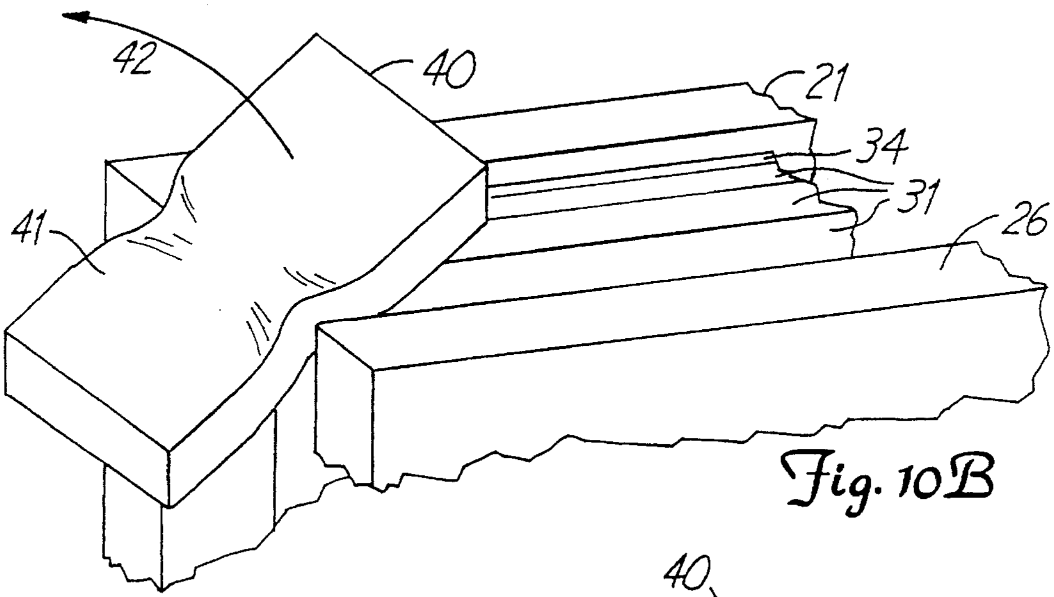
FIG. 10B is a partial perspective view of the resilient member of FIG. 10A in a compressed condition.

The positioning and use of the resilient member 40 is better understood by referring to FIGS. 10A and 10B. FIG. 10A shows a foam resilient member 40 fully expanded so that the gap 49 is formed between the interior surface of the second pane 26 and the adhesive 34 on the second side of the spacer 31. After the second pane 26 is driven against the adhesive 34 as described above, the resilient member 40 is compressed between the panes 21, 26 at an intermediate portion 41 as shown in FIG. 10B. The resilient member may be removed as shown by the arrow in FIG. 10B anytime after the glass assembly 20 is removed from the gas exchange chamber 60.

Figure 11A:
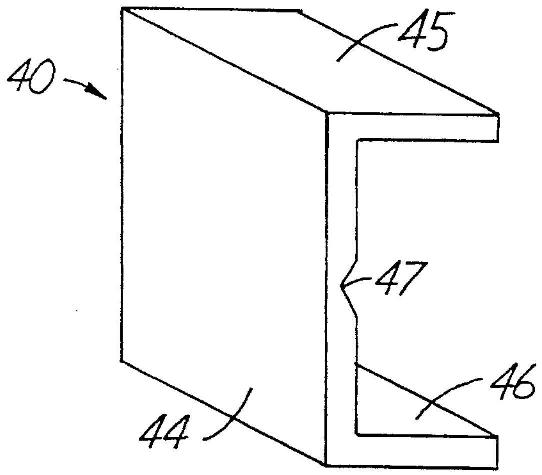
FIG. 11A is a perspective view of another resilient member in accordance with the invention in a fully expanded condition.
Figure 11B:
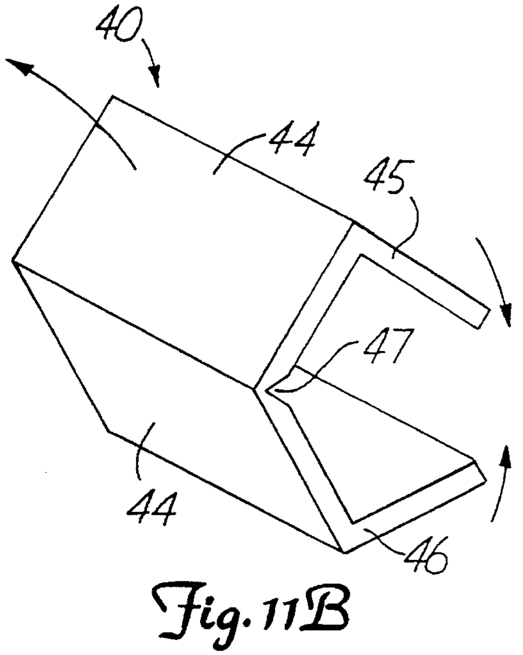
FIG. 11B is a perspective view of the resilient member of FIG. 11A in a compressed condition.

FIGS. 11A and 11B depict another resilient member 40 in accordance with the invention which is C-shaped is cross-section. The C-shaped resilient member 40 has a back section 44, a first leg 45 and a second leg 46. A furrow 47 runs longitudinally along the inner face of the back section 44. In operation, the outer face of the first leg 45 contacts the interior surface of one of the panes and the outer surface of the second leg 46 contacts the interior surface of the other pane. When the resilient member 40 is fully expanded as shown if FIG. 11 A, the width of the back section 44 (the distance between the first and second legs) is sufficient to create and maintain the gap as described above. As the panes are driven towards each other, the C-shaped resilient member 40 buckles along the furrow 47 as shown in FIG. 11B. The resilient member 40 may then be removed by simply pulling it out from between the panes.

While a preferred embodiment of the present invention has been described, it should be understood that various changes, adaptations and modifications may be made therein without departing from the spirit of the invention and the scope of the appended claims.

What is claimed is:

1. A method for assembling a small number of custom multipane glass assemblies and filling the assemblies with an insulating gas, comprising:

providing an assembly line having a lay-up station, a gas exchange chamber and roller means for transporting a glass assembly from the lay-up station to the gas exchange chamber, the gas exchange chamber having a support surface to receive the glass assembly and at least one movable platen;

providing first and second glass panes, each pane having a bottom edge, a top portion, an interior surface and an exterior surface, a spacer, a resilient member having a width larger than the width of the spacer and a supply of a sealant;

partially assembling the glass assembly by adhering the panes to the spacer while maintaining a gap between a portion of the spacer and one of the panes, and positioning the resilient member between the panes outwardly of the spacer to maintain the gap;

translating the partially assembled glass assembly into the gas exchange chamber;

drawing a vacuum within the gas exchange chamber so as to remove substantially all of the air within an interpane space through the gap;

admitting to the gas exchange chamber a gas having a coefficient of thermal conductivity lower than that of air, the gas filling the interpane space;

moving the at least one platen within the gas exchange chamber so as to compress the resilient member and sealingly adhere the interior surface of the second pane to the spacer, thereby eliminating the gap and substantially sealing the interpane space; and removing the resilient member from the glass assembly.

2. The method of claim 1, wherein the assembly line further includes a press station having at least one plate for further compressing the panes and spacer together in a precise manner, the method further comprising the step of pressing one of the plates against the second pane to further compress the panes and spacer together in a precise manner.

3. The method of claim 1, wherein the assembly line further includes means for sealing the perimeter of the glass assemblies across at least a portion of the width of the exterior of the spacer, the method further comprising applying a sealant across at least a portion of the width of the spacer around the perimeter of the exterior of the spacer.

4. The method of claim 1, wherein the lay-up station of the assembly line includes rollers which support the bottom edge of the glass panes during said step of partially assembling the glass assembly and which translate the partially assembled glass assembly into the gas exchange chamber; and the support surface of the gas exchange chamber includes a plurality of orifices therethrough, pressurized air being directed through the orifices during said step of translating the partially assembled glass assembly to provide an air bearing for the glass assembly.

5. The method of claim 1, wherein the resilient member comprises a generally c-shaped plastic member having a first leg, a second leg, and a back section joining the first and second legs, the back section including a longitudinal furrow, the resilient member being positioned during said step of partially assembling the glass assembly such that the first leg contacts the inner surface of the first glass pane and the second leg contacts the inner surface of the second glass pane; said compressing of the resilient menber comprising buckling the back section along the furrow.

6. The method of claim 1 wherein adhering the panes to the spacer in said step of partially assembling the glass assembly comprises adhering one side of the spacer to the first pane adjacent its bottom edge and adhering another side of the spacer to the second pane adjacent its bottom edge, the resilient member being positioned between the top portions of the first and second panes.

* * * * *